United States Patent [19]
Blomkvist et al.

[11] Patent Number: 5,574,231
[45] Date of Patent: Nov. 12, 1996

[54] MAGNETOELASTIC CONTACTLESS TORQUE TRANSDUCER WITH A SHAFT WITH A DUPLEX ANISOTROPIC MICROSTRUCTURE

[75] Inventors: Kent Blomkvist, Hallstahammar; Eva Wadman, Västerås, both of Sweden

[73] Assignee: Asea Brown Boveri AB, Vasteras, Sweden

[21] Appl. No.: 522,327

[22] PCT Filed: Feb. 14, 1994

[86] PCT No.: PCT/SE94/00115

§ 371 Date: Sep. 12, 1995

§ 102(e) Date: Sep. 12, 1995

[87] PCT Pub. No.: WO94/28385

PCT Pub. Date: Dec. 8, 1994

[30] Foreign Application Priority Data

May 27, 1993 [SE] Sweden .................................. 9301800

[51] Int. Cl.⁶ .................................................. G01L 1/00
[52] U.S. Cl. ................... 73/862.336; 73/862.333
[58] Field of Search ....................... 73/862.333, 862.334, 73/862.335, 862.336

[56] References Cited

U.S. PATENT DOCUMENTS

| | | |
|---|---|---|
| 4,627,298 | 12/1986 | Sahashi et al. . |
| 4,840,073 | 6/1989 | Aoki et al. . |
| 4,920,809 | 5/1990 | Yoshimura et al. . |
| 4,972,726 | 11/1990 | Yoshimura et al. . |
| 4,972,728 | 11/1990 | Yoshimura et al. . |

*Primary Examiner*—Richard Chilcot
*Assistant Examiner*—Ronald Biegel
*Attorney, Agent, or Firm*—Watson Cole Stevens Davis, P.L.L.C.

[57] ABSTRACT

A magnetoelastic torque transducer for electrically measuring torsional stresses in a shaft (1) which is provided with at least one zone (6, 7) with an anisotropy the effect of which is to deflect the magnetic flux density in a direction away from the natural direction along the shaft and where the shaft is of a material which has a geometrically anisotropic microstructure with at least two phases, of which one phase consists of relatively soft-magnetic continuous streaks with magnetoelastic properties and at least one phase has a considerably lower permeability, the deflection of the magnetic flux density in the zone/zones being achieved by mechanically distorting the shaft within the zone/zones.

4 Claims, 1 Drawing Sheet

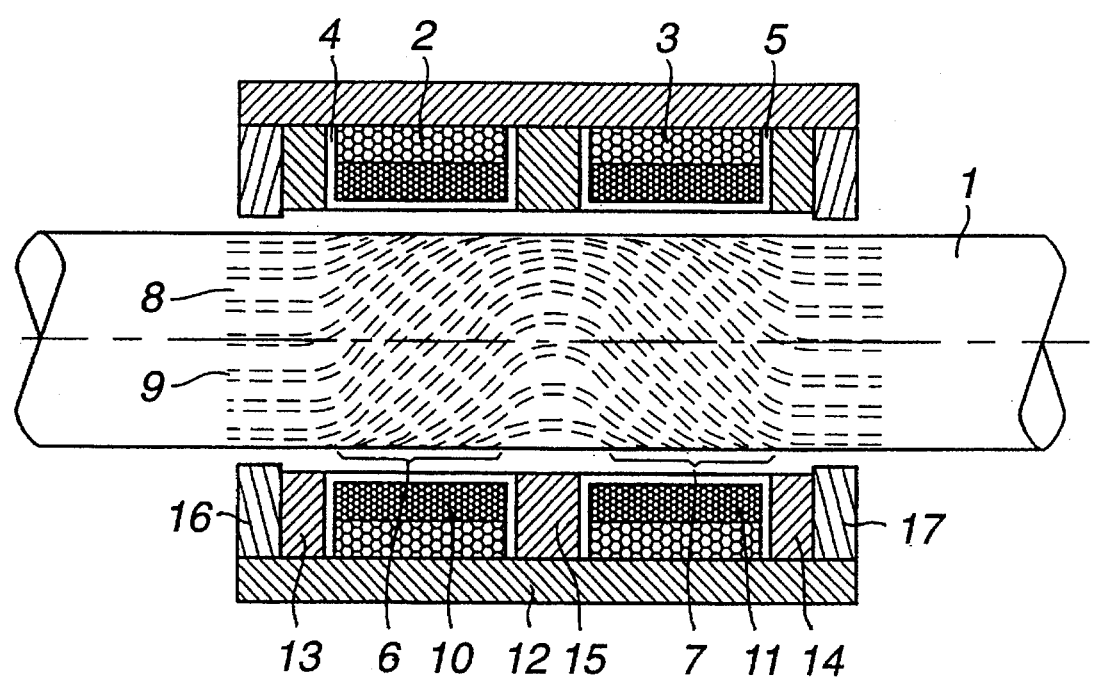

MAGNETOELASTIC CONTACTLESS TORQUE TRANSDUCER WITH A SHAFT WITH A DUPLEX ANISOTROPIC MICROSTRUCTURE

TECHNICAL FIELD

The present invention relates to a transducer for measuring, in a contactless manner, the torque acting on a stationary or a rotating shaft. In this context it is important that the shaft of the transducer exhibits anisotropic properties. To achieve a desired anisotropy in the shaft, according to the invention material is utilized which has a microstructure with at least two phases which are anisotropically distributed.

BACKGROUND ART, PROBLEMS

A circular cylindrical shaft which is subjected to a torque is influenced by a pure shear stress. This stress state can be expressed in terms of its principal stresses as a compressive stress and a tensile stress, directed perpendicularly thereto, of the same magnitude. The principal stress directions are inclined at ±45 degrees to a generatrix to the cylinder surface.

If, within a measurement range of the shaft, a rotationally symmetrical, homogeneous magnetizing field, that is an H-field, is created with the aid of a surrounding stationary exciting winding, an equally homogeneous magnetic flux density, that is, a B-field, is obtained in the shaft in non-loaded state. When the shaft is loaded, the field plot of the B-field is distorted, which can be detected with the aid of detection windings.

The state of the art as regards the constructive design of torque transducers is disclosed in a number of patent specifications and technical articles. Common to most of these solutions is that two zones are created in the magnetic material, with some form of anisotropy which causes the magnetic flux density to be deflected at an angle away from its natural direction in parallel with the generatrices to the cylinder surface of the transducer shaft. In one zone the principal direction of the anisotropy coincides with the principal stress direction which provides tensile stress. In the other zone, the principal direction coincides with the direction which provides compressive stress.

Because of the magnetoelastic effect, the zone reluctance will therefore decrease or increase, where the magnetic flux density has been deflected towards the tensile direction or the compressive direction in the case of positive magnetostriction. By finally measuring the difference in reluctance between these zones, a measure of the torque is obtained which has little sensitivity to axial forces or bending stress.

The reluctance difference between the zones is usually measured by creating, via a primary coil concentric with the shaft, a time-dependent H-field directed along the shaft and with equal amplitude in both zones. With the aid of two identical secondary coils, one across each zone, the difference in B-fields between the zones is measured. This is achieved in the simplest way by connecting the secondary coils in opposition in such a way that the induced voltages in the respective coil are subtracted from each other. By phase-sensitive rectification of the secondary signal obtained in this way, it is possible, in addition, to distinguish between torsional moments of different directions.

To create a high sensitivity to torsional moments, it is required that the anisotropy be sufficient, such that the difference between the zones becomes as great as possible.

A measure of the anisotropy is the angle at which the magnetic field is deflected from the natural direction parallel to the generatrix to the cylinder surface of the transducer shaft because of the influence of the anisotropy. If this angle is 45 degrees in the zones, the anisotropy is maximal as the B-field is then directed along the principal stress directions of the transducer shaft loaded with the torsion.

Of the utmost importance is also to really maintain a complete rotational symmetry, both with respect to the mechanical stress configuration and the magnetic field configuration in order to prevent a signal variation which is only due to the transducer being rotated in relation to the reluctance-measuring part.

According to the state of the art, there are a number of methods of achieving anisotropy, a few of which will be described in the following.

SU 667836 describes a method in which the anisotropy is created purely geometrically in each zone by cutting slits in the surface of the shaft according to a specific pattern. This pattern consists of a number of mutually parallel lines directed at an angle of 45 degrees to a generatrix to the cylinder surface of the transducer shaft. However, this solution entails a limited anisotropy and hence also low sensitivity, since the magnetic field can "creep under" the slits unless these slits are made deep. If the slits are made deep, however, the stress level in the surface of the shaft, and hence also the sensitivity, will be lowered. In addition, the slits in the surface lead to greatly increased effective stresses in the bottom of the slits and therefore the shaft can only be loaded to a moderate extent before plastic yielding of the shaft material sets in, which in turn leads to hysteresis in the output signal of the transducer.

U.S. Pat. No. 4,823,620 describes the same embodiment as above with respect to the geometrical anisotropy, however with the addition that the surface is hardened or carburized for the purpose of reducing the hysteresis in the transducer.

SU 838448 describes a method in which an attempt has been made to increase the sensitivity by instead producing slits by knurling a similar pattern onto the shaft surface. In this way the anisotropy is increased by plastically deforming the material nearest the slit. This provides high residual stresses and hence a lower permeability along the bottom of the slits and, therefore, an anisotropy of a magnetic nature. The problem with yielding in the shaft material will probably be accentuated with such a solution although plastic machining per se increases the yield point.

In a torque transducer according to U.S. Pat. No. 4,506,554 anisotropy is obtained by using a sleeve of magnetoelastic material with cut-away slits in the principal stress directions. In this way the magnetic field can be prevented from "creeping under" the slits as above and a certain freedom is obtained in choosing a shaft material with other magnetic properties than the sleeve material. The latter material must primarily be chosen in view of the magnetic properties.

Another realization of the same kind is described in IEEE Trans Magn, Vol. MAG-22, No. 5, pp. 403–405, by Mohri et al. Here, a 100 micrometer thick "sleeve" with continuous slits on a stainless shaft is obtained by spraying onto the shaft droplets of a molten magnetoelastic alloy through a mask.

Other variants of the same method are described where strips of an amorphous magnetoelastic material are glued or otherwise applied to a magnetic or non-magnetic transducer shaft in the principal stress directions thereof. The problems with residual stresses, temperature drift, etc., are often awkward for these designs.

For transducers which are to be used for measuring torque which is always directed in one and the same direction, it is, in principle, sufficient to have one measuring zone on the transducer shaft. In other contexts and for special purposes, more than two measuring zones may also be used.

EP 0 270 122 B1 describes a "Magnetoelastic torque transducer" which is also based on the magnetoelastic principle and comprises in the usual manner excitation and sensing windings. The transducer shaft here has a ferromagnetic magnetoelastic region, selected from the group of materials which consists of iron-nickel martensite, hardenable and thermally hardened steels, which exhibit a substantially isotropic magnetostriction with an absolute amount of at least 5 ppm and containing from 0.05 to 0.75 per cent by weight carbon and a sufficient amount of an element selected from the group nickel, chromium, cobalt, titanium, aluminium, manganese, molybdenum, copper, boron, and combinations thereof to increase the magnetostriction value to at least 5 ppm in absolute amount. A form of anisotropy is here achieved by creating residual stresses in the material with the aid of cold-working, for example rotation or rolling.

As mentioned under "Technical Field" above, the invention is based on the use of material in the shaft of the transducer with a microstructure with at least two phases which are anisotropically distributed. It is commonly known that an example of such a material is a bar of ferritic-austenitic stainless steel. The bar manufacture is performed by greatly directed forming steps which give the bar a geometrically anisotropic microstructure in the form of axially directed long parallel streaks of ferrite and austenite.

SUMMARY OF THE INVENTION

A magnetoelastic torque transducer according to the invention is based both on the choice of material in the shaft of the transducer and on the way in which the anisotropic microstructure of the chosen material is utilized to bring about the above-described desired deflection of the magnetic flux density.

A shaft blank which may very well be used is the above-mentioned example with a bar of ferritic-austenitic stainless steel. To use more general terms, the shaft blank having a microstructure with at least two phases, of which one phase being relatively soft-magnetic with magnetoelastic properties, and at least one phase having a considerably lower permeability. The microstructure being geometrically anisotropic with—as far as possible—continuous narrow streaks of the more soft-magnetic structure component. Across the streak direction, the soft-magnetic streaks are separated by the phase/phases with lower permeability, whereby the resultant permeability of the material becomes anisotropic.

There are a number of ways to achieve the directed microstructure. Both directed casting/solidification and zone melting, rolling, extrusion and tension provide a microstructure with oriented streaks. A bar blank with continuous streaks in one direction can also be manufactured by, for example, HIP treatment of a package of wires of material with considerably different magnetic permeability.

For the shaft blank to be able to function as a transducer shaft in a torque-measuring device, it is a requirement, as mentioned above, that the desired magnetic deflection is achieved in some way, preferably in the form of zones with an anisotropy which coincides with the principal stress directions which provide tensile stress and compressive stress, respectively, in the shaft when being loaded. The active measuring zone has a certain depth from the envelope surface and towards the centre corresponding to the depth of penetration which is larger for a partly ferromagnetic material than for a single-phase material with similar electrical resistivity. Because the angle of the streaks with the generatrix varies with the radius of the shaft and is zero in the centre of the shaft, in case of optimum deflection the angle of the streaks with a generatrix to the envelope surface should be somewhat more than 45 degrees at the envelope surface in order to be 45 degrees somewhat below the envelope surface within the depth of penetration.

The fact that the field penetrates deeper in under the surface for partially ferromagnetic material also entails the advantage that the surface quality does not affect the magnetic properties to the same high extent.

The creation of the desired preferential directions, that is, rotation of the structure, can be realized in many different ways and at different times during the manufacture of the shaft blank in question.

The simplest way is to apply a torsional moment in one direction on that part of the shaft which is intended to correspond to one of the zones and then to apply an equally great torsional moment in the opposite direction in an adjacent region which is intended to correspond to the other zone. The residual stresses which are achieved in this way, in contrast to the necessary residual stress mentioned in the above-mentioned EP document, can be removed by stress-relieving annealing. The machined anisotropic structure can thus be recovered. These processes increase the permeability and hence also the sensitivity of the transducer.

DESCRIPTION OF THE PREFERRED EMBODIMENTS

A preferred embodiment of a magnetoelastic transducer for electrical measurement of torsional stresses in a shaft according to the invention is shown in the accompanying FIGURE which shows an axial section through the stationary part of the transducer with excitation and sensing windings as well as outer yokes and a surface picture of the shaft of the rotationally symmetrical transducer showing the anisotropic microstructure.

The transducer comprises a circular-cylindrical shaft 1 in which the torque is to be measured. As is clear from the above, the transducer shaft is made of a material which exhibits an anisotropic microstructure. This means that the shaft blank shall have a microstructure with at least two phases, of which one phase is relatively soft-magnetic with magnetoelastic properties, and at least one phase shall have a considerably lower permeability. The microstructure has geometrically anisotropic with—as far as possible—continuous narrow streaks of the more soft-magnetic structural component. Across the direction of the streaks, the soft-magnetic streaks are separated by the phase/phases with lower permeability, whereby the resultant permeability of the material becomes anisotropic.

Further, the transducer comprises a device for creating an axially magnetizing field, cyclically varying in time, within the measurement range in question. This device comprises two primary coils 2 and 3, wound in two bobbins 4 and 5, concentric with the torque-sensing shaft 1. The primary coils are series-connected and are connected to a signal generator.

Within the measurement range, two measuring zones 6 and 7 have been created in the shaft. This has been done, for example, by mechanically distorting the zone regions in the manner described above. In one of the zones, the axially directed magnetizing flux is deflected along one of the principal stress directions which is loaded with tensile stress when the transducer shaft is loaded in torsion. In the other zone, the field is deflected in a corresponding way along the other principal stress direction which provides compressive stress. The anisotropic microstructure is illustrated in the figure by the dashed distorted streaks which, if the shaft material consists of a ferritic-austenitic stainless steel, describe the ferrite streaks 8. Between these streaks there are austenitic streaks 9 with considerably lower permeability.

To bring about the optimum deflection of the flux, described under the "Summary of the invention", a relatively accurately balanced torque is required, based on the current shaft dimension, mechanical properties, etc., during the mechanical distortion of the zones.

In the usual manner, the transducer also comprises a device for electrically measuring the reluctance differences between the zones induced by the torsional stresses.

One simple method of realizing the above is to measure the derivative of the flux in the measuring zones 6 and 7 via two secondary coils 10 and 11 which are wound onto the same bobbins as the primary windings. By connecting the secondary windings in opposition, a voltage corresponding to the flux difference is generated. This voltage is connected to a phase-sensitive rectifier which, in turn, is controlled by the phase of the supply signal generator. The higher frequencies of the output signal are filtered away in a low-pass filter, whereupon a direct voltage is obtained which is proportional to the torque which loads the shaft.

To prevent the torque transducer from being influenced by magnetic or electrically conducting objects in the vicinity thereof, and to increase the sensitivity to torques, it is desirable to confine and control the magnetic field such that its extent is limited to a region around the torque-measuring zones 6 and 7 and the reluctance-measuring devices 10 and 11 associated therewith.

This is achieved by surrounding the bobbins by windings with a yoke of soft-magnetic material. The yoke consists of a shell 12 and of two poles 13 and 14 which concentrate the flux to the air gap at the ends of the yoke. To facilitate the redistribution of the flux between the zones and hence increase the sensitivity, the yoke is also provided with a pole 15 between the bobbins. In addition, the yoke is provided at the axial ends with annular washers 16 and 17 which prevent the flux from "leaking out" in the axial direction.

We claim:

1. A magnetoelastic torque transducer for electrically measuring torsional stresses in a shaft, wherein the transducer comprises a first device for creating an axially directed magnetizing field in the shaft, cyclically varying in time, the shaft being provided with at least one zone provided with an anisotropy, the effect of which is to deflect the magnetic flux density in a direction away from the natural direction along the shaft, and a second device for measuring the reluctance differences, induced by the torsional stresses, between a zone where the magnetic field has been deflected and a region where the magnetic field has not been deflected, and between zones where the magnetic field has been deflected in different directions, respectively, wherein the shaft is formed of a material which has a geometrically anisotropic microstructure with at least two phases, of which one phase comprises relatively soft-magnetic continuous streaks with magnetoelastic properties and at least one phase which has a considerably lower permeability, and the deflection of the magnetic flux density in the zone/zones takes place by mechanically distorting the shaft within the zone/zones.

2. A magnetoelastic torque transducer for electrically measuring torsional stresses in a shaft according to claim 1, wherein the angle between the magnetic preferential direction in the zone/zones after the distortion and a generatrix to the cylinder surface of the shaft is greater than 20 degrees and smaller than 75 degrees.

3. A magnetoelastic torque transducer for electrically measuring torsional stresses in a shaft according to claim 1, wherein the shaft is distorted in the zone/zones without residual stress.

4. A magnetoelastic torque transducer for electrically measuring torsional stresses in a shaft according to claim 1 wherein the shaft is heat treated to relieve residual stress.

\* \* \* \* \*